(12) United States Patent
Grassin et al.

(10) Patent No.: US 6,355,284 B1
(45) Date of Patent: Mar. 12, 2002

(54) FRUIT JUICE CLARIFICATION

(75) Inventors: Catherine Marie Thérèse Grassin; Pierre Clément Louis Fauquembergue, both of Sëclin; Francois-Xavier Nolle, Aulnois Sous Laon, all of (FR)

(73) Assignee: DSM N.V. (NL)

( * ) Notice: Subject to any disclaimer, the term of this patent is extended or adjusted under 35 U.S.C. 154(b) by 0 days.

(21) Appl. No.: 09/474,027

(22) Filed: Dec. 28, 1999

(51) Int. Cl.[7] .................. A23L 3/3571; A23B 7/155
(52) U.S. Cl. .................. 426/51; 426/50; 426/489
(58) Field of Search .................. 426/50, 51, 330.5, 426/489, 495

(56) References Cited

U.S. PATENT DOCUMENTS

| 4,211,799 A | 7/1980 | Grampp et al. | |
|---|---|---|---|
| 4,620,980 A | 11/1986 | Dumont | 426/330.5 |
| 5,112,627 A * | 5/1992 | Perletti et al. | 426/50 |

FOREIGN PATENT DOCUMENTS

GB    1 535 983    12/1978

OTHER PUBLICATIONS

Quere, J.M. Le et al., (Jan. 1988) "Clarification of cider apple must prior to fermentation" Industries Alimentarires et Agricoles, ISSN 0019–9311 (AN 88–1–12–h0065) vol. 105(3), pp. 137–139.

* cited by examiner

Primary Examiner—Keith Hendricks
(74) Attorney, Agent, or Firm—Morrison & Foerster LLP

(57) ABSTRACT

The present invention relates to clear fruit juices and to a process for the production thereof. A fast process is provided that comprises the combined use of pectin esterase and flotation.

13 Claims, No Drawings

FRUIT JUICE CLARIFICATION

FIELD OF THE INVENTION

The present invention relates to substantially clear fruit juices and to a process to prepare these clear fruit juices.

BACKGROUND OF THE INVENTION

The manufacturing of fruit juices typically involves fruit squeezing, followed by depulping and centrifugation. The depulped juice is pasteurized as soon as possible after depulping in order to prevent oxidation. The juice thus obtained can be clarified with sulfur dioxide ($SO_2$), fining agents or enzymes before pasteurization, solid removal and concentration.

Fruit juices in general and citrus fruit juices in particular are very difficult to clarify because of their high acidity. After juice extraction and pasteurization, the cloudy citrus juices are usually stored at 2–15° C. for months so that they can clarify slowly, before further processing. The temperature must be kept low to prevent oxidation reactions in the juice. Two other factors that complicate clarification of citrus fruit juice are the presence of protein and pectin.

One conventional method of clarifying juice is adding $SO_2$ as a clarification agent. However, this may result in high concentrations of $SO_2$ in the juice which is undesired. Although this can be solved by desulfitation, some $SO_2$ will remain in the juice. In addition, juice manufacturers must invest in large storage capacities since the juice has to be stored for quite a long time.

Another conventional method for clarifying juice is adding pectinases after squeezing, depulping and pasteurisation. The dosage used is usually rather high and the clarification takes several hours, sometimes even days, depending on the temperature. Then the juice may be fined with bentonite or silica sol and filtered on an earth filter and/or an ultrafilter. This process is also time-consuming and may result in a rather high waste production.

U.S. Pat. No. 4,624,980 discloses a process for the continuous clarification of fruit juices comprising the addition of coagulants that form a floc with the solid particles in the juice. The latter are then separated by introducing a non-deleterious gas in the form of micro-bubbles which causes the floc particles to float to the surface of the juice.

Le Quere et al. (Industries Alimentaires et Agricoles, 105, 137–139, 1988) disclose a method for clarifying specifically cider apple must prior to fermentation involving a pectin demethylation step by pectin esterase for 66–72 hours, subsequent addition of a $CaCl_2$ solution and nitrogen gas and flotation of the pectic gel thus formed.

G.B. patent 1,535,983 discloses a method to clarify lemon juices and comprises the addition of a combination of polygalacturonase and pectin esterase in order to eliminate the pectin completely in combination with colloidal silica.

Similarly, U.S. Pat. No. 4,211,799 discloses a method of making citrus juice resistant to flocculation on storage by treating the naturally turbid citrus juice having a pH below 2.5 with a pectinase of the polygalacturonase/pectin esterase type at a temperature below 30° C. until the alcohol test for pectin is negative and then decanting the flocculation resistant supernatant juice after settling.

Therefore, there is still a need for a fast process for the clarification of fruit juices in general, in particular for the clarification of citrus fruit juices. Surprisingly we have found that fast clarification of fruit juices could be obtained by applying a pectin esterase treatment during 0.5–48 hours in combination with a flotation technique.

SUMMARY OF THE INVENTION

The present invention relates to a process for the production of substantially clear fruit juices with a turbidity less than 300 NTUs from the corresponding fruit comprising the following steps i. extract the fluid part from the fruit and depulping and optionally pasteurizing the fluid part;

ii. incubate this fluid part of the juice with an enzyme preparation containing pectin esterase and optionally calcium ions between 0.5 and 48 hours;

iii. transfer the enzyme treated fluid part of the fruit to a flotation tank followed by pressurization;

iv. release the pressure and allow the solid particles in the enzyme treated fluid part of the fruit to float to the surface, followed by removal of the insoluble particles and v. recover the substantially clear fruit juice.

In another aspect, the invention relates to clear fruit juices with a turbidity of less than 300 NTUs.

In a further aspect, the invention relates to the use of pectin esterase in combination with a flotation technique for the production of substantially clear fruit juices.

DETAILED DESCRIPTION OF THE INVENTION

The present invention solves the problem of how to clarify fruit juices, more particularly, how to clarify citrus fruit juices. According to the present invention this problem can be solved by a simple process which includes the use of a pectin esterase treatment and flotation. This process is faster than conventional processes.

The process involves releasing the fluid part from the fruit, mechanically, enzymatically or by a combination of both. Then, after depulping and optionally pasteurization, pectin esterase is added to the fluid part of the fruit. The pectin esterase used is preferably free of pectin depolymerising activities such as pectin lyase (PL) and polygalacturonase (PG), resistant to high acidity (pH lower than 2) and active at low temperatures (10°–50° C.). The pectin esterase treatment takes only a relatively short time compared with conventional fruit juice clarification processes. The pectin esterase treatment lasts 0.5–48 hours, preferably 0.5–24 hours and more preferably 1–5 hours. Treatment times vary depending on the amount of pectin esterase and temperature used. Pectin esterase dosage may vary from 100–100,000, more preferably from 1,000–50,000 and more preferably from 1,000–15,000 pectin esterase units per hectoliter. The temperature may be chosen between 0 and 45° C., preferably between 0 and 35° C. and more preferably between 2 and 200° C.

Subsequently, the enzyme treated fluid part of the fruit is subjected to flotation in order to get a substantially clear juice. Then, the juice is introduced in the flotation tank in a pressurized state. Pressure conditions are 2–10 bars, preferably 2–7 bars and more preferably 4–7 bars and are applied for 1–120 minutes, preferably 2–120 minutes and more preferably for 2–60 minutes. After this time, the pressure is released causing the juice particles to float and separate out from the juice.

Optionally, calcium may be added during flotation, for instance as calcium chloride. Preferred calcium chloride concentrations range from 1–500, more preferably from 10–500 and more preferably from 10–200 grams per hectoliter.

The turbidity of the substantially clear fruit juices obtained by the present invention can be determined by several methods. The most common method is to express the turbidity in Nephelometry Turbidity Units (NTUs). The substantially clear fruit juices obtained by the present invention have a turbidity less than 300 NTU, preferably less than 200 NTU and more preferably less than 100 NTU.

With another method the filterability of the substantially clear fruit juices is determined by filtering these juices through paper filters and measuring the amount of the filtrate as a function of time. The less turbid the substantially clear fruit juice, the larger the amount of the filtrate per unit of time.

Similarly, the ultrafiltration (UF) capacity of the substantially clear fruit juices can be determined by filtering these juices through ultrafilters and measuring the amount of the ultrafiltrate as a function of time. The less turbid the substantially clear fruit juice, the larger the amount of the filtrate per unit of time.

Materials & Methods

The pectin esterase can originate from any source, such as from microorganisms or plants. The pectin esterase suitable for the use according to the present invention is stable in fruit juice medium and retains its activity during the juice processing. Due to the desired enzyme characteristics, the pectin esterase preferably originates from a fungus. More preferably it originates from Aspergillus, especially from *Aspergillus niger*.

The crude pectin esterase obtained from a culture medium can be purified in a number of ways. Preferably, the purification results in a product that is substantially free from depolymerising activities such as polygalacturonase and pectin lyase. The crude enzyme may be purified for example by liquid chromatography (ion exchange, gel filtration, affinity) (Ishii et al., 1980, U.S. Pat. No. 4,200,694) or by selective inhibition of the depolymerising activities (e.g. by pH shock, heat shock, chemical inhibitors, chemical or organic solvent extraction) (Smythe C. et al., 1952, U.S. Pat. No. 2,599,531). Another source for obtaining purified pectin esterase as defined for the present application is pectin esterase obtained by recombinant DNA technology. An example is the expression cloning of the *Aspergillus niger* pectin esterase for which the cDNA sequence has been determined (Khanh et al., 1990, Nucl. Acids Res. 18, 4262). As expression host *Aspergillus niger* could be used. However, in view of the possible contamination of the pectin esterase with polygalacturonase, pectin lyase and other depolymerising activities it may be preferable to use a heterologous host organism for producing the pectin esterase. Suitable host organisms include bacteria and fungi. Preferred species would be Bacilli, Escherichia, Saccharomyces, Kluyveromyces and Aspergilli.

RAPIDASE CLEAR LEMON® is a commercially available product from the Beverage Ingredients Group of DSM Food Specialties (Seclin, France) and contains a pectinase preparation from *Aspergillus niger* with pectin esterase, polygalacturonase, pectin lyase and arabanase as main activities (Table 1).

TABLE 1

Properties of the enzyme preparations.

| | Activities (units/g) | | |
|---|---|---|---|
| Enzyme preparation | pectin lyase | pectin esterase | poly-galacturonase |
| Pectin esterase purified from *Aspergillus niger* | 0 | 300 | 0 |
| RAPIDASE CLEAR LEMON® | 112,000 | 60 | 200 |

Assay of pectin esterase (PE) activity

One PE Unit is defined as the amount of enzyme that hydrolyzes one micro-equivalent carboxymethyl groups per minute at 30° C. and pH 4.5. The substrate is an aqueous solution of 0.5% apple pectin (Ruban Brun) with a methylation degree of >70%. One PE Unit =0.98 PE International Unit.

Assay of pectin lyase (PL) activity

One PL Unit is defined as the amount of enzyme producing one micromole of unsaturated Δ4,5-uronic product in one minute. The extinction coefficient at 235 nm is $5.55 \times 10^3$ $M^{-1} \cdot cm^{-1}$. The reaction is performed at 45° C. and pH 5.5 and the substrate is an aqueous solution of 1% (w/v) surmethylated pectin. The optical density, measured at 235 nm, is read after a reaction time of 10 minutes.

Assay of endo-Polygalacturonase (PG) activity

One PG Unit is defined as the amount of enzyme in 1 ml of enzymatic solution that decreases the substrate viscosity with a rate having an apparent rate constant of 0.0053 per minute at 45° C. and pH 4.5. The substrate is an aqueous solution of 0.5% sodium polygalacturonate.

Reaction conditions for the assays described above are standard for these assays. The enzyme is added to the assay medium that consists of the indicated substrate solution buffered at the desired pH.

Flotation was carried out in a flotation tank with pressurization equipment with a 2 liter capacity laboratory flotator (type TMCI Padovan).

Turbidity of the juices is expressed as Nephelometry Turbidity Units (NTUs) measured at atmospheric pressure. The method is based on infrared absorbance measurements of particles with a diameter of >2 microns.

The filterability of the clarified juices was measured at atmospheric pressure using Prat Dumas n°2 paper filters in a funnel mounted on top of a calibrated flask.

The ultrafiltration (UF) capacity of the juices was measured using Ultrafree Millipore devices equipped with polysulfon membranes with a cut-off of 30 kDalton. The weight of filtrate was measured after centrifugation the devices for 1.5 hour at 2500×g and at 20° C.

In the following example, the effect of the combined pectin esterase treatment and flotation for the production of a clear lemon juice will be demonstrated.

EXAMPLE 1

Production of clear lemon juice

Lemon juice was prepared with a Philips Citrus-1000 citrus press (40% yield =weight of the fluid part of the fruit/total weight of the fruit) and then sieved through a 0.5 mm sieve. The turbidity of the resulting juice was 580 NTU.

The juice was divided in 4 parts of 250 ml each for the trials as indicated in Table 2.

TABLE 2

| Trial | Juice (ml) | Enzyme | Dosage g/hl | anhydrous $CaCl_2$ (g/hl) | Flotation |
|---|---|---|---|---|---|
| 1 | 250 | purified pectin esterase | 20 | 0 | yes |
| 2 | 250 | purified pectin esterase | 20 | 50 | yes |
| 3 | 250 | RAPIDASE CLEAR LEMON® | 20 | 0 | yes |
| 4 | 250 | RAPIDASE CLEAR LEMON® | 20 | 0 | no |

The beakers containing the juice were placed in a water bath at 35° C. and allowed to reach temperature equilibrium; after adding the other components as indicated in Table 2, the mixture was stirred and kept for 5 hours at 35° C.

Then the juices were kept under pressurization with stirring for 2 minutes at 6 bars. Pressurization was stopped and the juice was poured in 500 ml vessels in order to let insoluble particles float to the surface. The insoluble pectate coagulum was removed from the surface of the juice with a spatula. The following analyses were carried out:

1. turbidity of the juice obtained after enzyme- and flotation treatment and pectate coagulum removal (expressed as NTU).

2. filterability of the juice on paper filters.

3. turbidity of the paper-filtered juices (expressed as NTU).

4. filterability by ultra-filtration using Ultrafree Millipore devices.

These analyses were carried out 1 hour after and repeated 3 hours after the juices were obtained from the enzyme and flotation treatment.

Table 1 shows that in the incubations comprising purified pectin esterase (trials 1 and 2) much more pectate coagulum was formed compared to the incubations with RAPIDASE CLEAR LEMON (trials 3 and 4). Also, the juices obtained from trials 1 and 2 are much clearer (Table 1–$3^{rd}$ column) compared to the juices from trials 3 and 4, the latter being as turbid as the untreated juice (580 NTU). The turbidity measured after 3 hours shows the same trend (Table 1–$11^{th}$ column).

The filterability on paper filters, expressed as the volume (ml) of filtrate collected at indicated time points, was also much higher for the juices of trials 1 and 2 compared to the juices from trials 3 and 4, both at 1 hour and 3 hours after the enzyme- and flotation treatment (Table 1, columns 4–8 and 12 respectively). Also the turbidities of the filtrates was much lower in case of trials 1 and 2 compared to trials 3 and 4 (Table 1, columns 9 and 13).

The filterability as measured by ultrafiltration using Ultrafree Millipore devices was also much higher for the juices from trials 1 and 2 compared to those of trials 3 and 4 (Table 1—columns 10 and 14).

d) releasing the pressure wherein the solid particles in the enzyme-treated fluid part float to the surface, followed by removal of the insoluble particles that floated to the surface, and e) recovering the clear fruit juice.

2. The process according to claim 1 wherein the fluid part is extracted mechanically, enzymatically or by a combination thereof.

3. The process according to claim 1 wherein said incubating is with pectin esterase at a final concentration of 100–100,000 pectin esterase units per hectoliter of the fluid part.

4. The process according to claim 1 wherein calcium ions are added as calcium chloride to a final concentration of 1–500 gram per hectoliter.

5. The process according to claim 1 wherein the temperature is kept between 0–45° C.

6. The process according to claim 1 wherein pressurization is from 2–10 bars.

7. The process according to claim 1 wherein pressurization is carried out for 1–120 minutes.

8. The process according to claim 1 wherein said juice has a turbidity of less than 200 NTU.

9. The process according to claim 8 wherein the fruit is citrus fruit.

10. The process according to claim 9 wherein the citrus fruit is lemon.

11. A method of using pectin esterase in combination with a flotation technique for the production of clear fruit juice having a turbidity of less than 300 NTU comprising a) incubating depulped, and optionally pasteurized, juice extracted from fruit with an enzyme preparation con-

TABLE 3

Results

Properties of the juice after enzyme treatment and flotation and removal of the pectin coagulum.

| | | | After 1 hour | | | | | | | After 3 hours | | | |
|---|---|---|---|---|---|---|---|---|---|---|---|---|---|
| | Pectate coagulum | Turbidity[a] | Filterability[b] filtration time (minutes) | | | | | Ultrafiltrate[c] | Turbidity[a] | Filterability[b] volume after 1.5 min of filtration | | Ultrafiltrate[c] |
| Trial | ml | NTU | 1 | 2 | 3 | 4 | 10 | NTU | g | NTU | ml | NTU | g |
| 1 | 75 | 258 | 10.0 | 11.5 | 12.5 | 13.0 | 13.7 | 97 | 1.06 | 76 | 34 | 78 | 1.15 |
| 2 | 75 | 250 | 9.5 | 11.0 | 12.0 | 12.5 | 14.0 | 98 | 1.00 | 122 | 32 | 117 | 0.80 |
| 3 | 35 | 580 | 5.5 | 6.5 | 7.5 | 8.5 | 11.5 | 355 | 0.50 | 433 | 28 | 317 | 0.52 |
| 4 | ~0 | 567 | 5.0 | 6.5 | 7.0 | 7.2 | 8.4 | 373 | 0.50 | 367 | 19 | 312 | 0.56 |

[a]The turbidity of the filtrate is given in NTU
[b]The filterability is expressed as ml liquid collected after the indicated filtration time.
[c]Ultrafiltrate collected after ultrafiltration of 2.5 ml of the juice.

What is claimed is:

1. A process for the production of clear fruit juices with a turbidity less than 300 NTUs comprising a) extracting the fluid part from fruit, depulping, and optionally pasteurizing the fluid part, b) incubating said fluid part with an enzyme preparation containing pectin esterase, and optionally calcium ions, for 0.5 to 48 hours;

c) transferrinig the enzyme-treated fluid part to a flotation tank followed by pressurization within said flotation tank, taining pectin esterase, and optionally calcium ions, for 0.5 to 48 hours;

b) pressurizing a flotation tank containing the enzyme treated juice after its transfer to said flotation tank;

c) recovering clear fruit juice after removal of insoluble particles that floated to the surface of said treated juice after release of said pressure.

12. The method according to claim 11 wherein the fruit is citrus fruit.

13. The method according to claim 12 wherein the citrus fruit is lemon.

* * * * *